United States Patent
Shen et al.

(10) Patent No.: US 8,352,634 B2
(45) Date of Patent: Jan. 8, 2013

(54) ON-DEMAND PROPAGATION OF ROUTING INFORMATION IN DISTRIBUTED COMPUTING SYSTEM

(75) Inventors: Jinmei Shen, Rochester, MN (US); Hao Wang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1403 days.

(21) Appl. No.: 11/697,341

(22) Filed: Apr. 6, 2007

(65) Prior Publication Data

US 2008/0250099 A1  Oct. 9, 2008

(51) Int. Cl.
*G06F 15/173* (2006.01)

(52) U.S. Cl. ........ 709/238; 709/201; 709/202; 709/203; 709/242

(58) Field of Classification Search .......... 709/201–203, 709/238, 242
See application file for complete search history.

(56) References Cited

U.S. PATENT DOCUMENTS

| | | | |
|---|---|---|---|
| 5,774,660 A * | 6/1998 | Brendel et al. ................ | 709/201 |
| 5,926,805 A | 7/1999 | Hurvig et al. | |
| 6,078,960 A * | 6/2000 | Ballard ......................... | 709/229 |
| 6,567,380 B1 * | 5/2003 | Chen .............................. | 370/238 |
| 6,598,077 B2 * | 7/2003 | Primak et al. ................. | 709/219 |
| 6,845,505 B1 | 1/2005 | Adunuthula et al. | |
| 7,035,227 B2 * | 4/2006 | Garcia-Luna-Aceves et al. ............................. | 370/254 |
| 7,065,764 B1 | 6/2006 | Prael et al. | |
| 7,203,496 B2 * | 4/2007 | Halsell ........................... | 455/445 |
| 7,257,684 B1 | 8/2007 | Sinha et al. | |
| 2002/0101869 A1 * | 8/2002 | Garcia-Luna-Aceves et al. ............................. | 370/389 |
| 2003/0033520 A1 | 2/2003 | Peiffer et al. | |
| 2003/0060202 A1 * | 3/2003 | Roberts ......................... | 455/445 |
| 2003/0074453 A1 | 4/2003 | Ikonen | |
| 2003/0149755 A1 | 8/2003 | Sadot | |
| 2003/0158951 A1 * | 8/2003 | Primak et al. ................. | 709/229 |
| 2003/0217081 A1 | 11/2003 | White et al. | |
| 2004/0068576 A1 * | 4/2004 | Lindbo et al. ................. | 709/232 |
| 2005/0188091 A1 | 8/2005 | Szabo et al. | |
| 2005/0289388 A1 | 12/2005 | Black-Ziegelbein et al. | |
| 2006/0080273 A1 | 4/2006 | Degenaro et al. | |
| 2008/0253306 A1 * | 10/2008 | Manion et al. ................ | 370/255 |

FOREIGN PATENT DOCUMENTS

EP  1753195 A1  2/2007

OTHER PUBLICATIONS

U.S. Appl. No. 11/548,351, filed Oct. 11, 2006 by Jinmei Shen et al., entitled "Dynamic On-Demand Clustering".
Yoshikawa, Chad et al, "Using Smart Clients to Build Scalable Services", Proceedings of the Usenix Annual Technical Conference, Jan. 6, 1997, pp. 105-117.

* cited by examiner

*Primary Examiner* — Mohamed Wasel
(74) *Attorney, Agent, or Firm* — Wood, Herron & Evans LLP

(57) ABSTRACT

An apparatus, program product and method utilize on-demand propagation of routing information to reduce the overhead associated with distributing routing information throughout a distributed computing system. The staleness of the routing information utilized in routing client requests for a particular client is gauged based upon the number and/or frequency of client requests issued for that client that require rerouting, e.g., as indicated in responses returned in response to the client requests. Once the reroutes of client requests meet a desired propagation criterion, updated routing information is then requested for the client.

25 Claims, 3 Drawing Sheets

ON-DEMAND PROPAGATION OF ROUTING INFORMATION IN DISTRIBUTED COMPUTING SYSTEM

FIELD OF THE INVENTION

The invention is generally directed to distributed computing systems, and in particular, to the propagation of routing information to request routers in distributed computing systems.

BACKGROUND OF THE INVENTION

Distributed computing systems have found application in a number of different computing environments, particularly those requiring high performance and/or high availability and fault tolerance. In a distributed computing system, multiple computers connected by a network are permitted to communicate and/or share workload. Distributed computing systems support practically all types of computing models, including peer-to-peer and client-server computing.

One particular type of distributed computing system is referred to as a clustered computing system. "Clustering" generally refers to a computer system organization where multiple computers, or nodes, are networked together to cooperatively perform computer tasks. An important aspect of a computer cluster is that all of the nodes in the cluster present a single system image—that is, from the perspective of a client or user, the nodes in a cluster appear collectively as a single computer, or entity. In a client-server computing model, for example, the nodes of a cluster collectively appear as a single server to any clients that attempt to access the cluster.

Clustering is often used in relatively large multi-user computing systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

As the complexity of and demands placed on clustered and other distributed computing systems increases, scalability and performance become increasing concerns. It is not unreasonable to expect a distributed computing system to provide services for potentially millions of clients, and it has been found that as the complexity of the distributed computing systems used to service these clients increases, the distribution of workload between the servers, nodes or other computers constituting such systems becomes increasingly more critical to the stability and performance of such systems. At the forefront of appropriately distributing the workload is the routing of client requests to appropriate computers, e.g., servers, in a distributed computing system.

Effectively coordinating the routing of requests from potentially millions of clients has become a significant factor in the overall performance of a distributed computing system. Routing protocols require not only the even distribution of workload across the available servers, but also the ability to handle the unavailability of certain servers, as well as the distribution of services among only subsets of servers.

It has been found that centralized routing, where client requests are all initially sent to one server or component and thereafter routed to the appropriate server for handling, can be both a source of failure and a bottleneck on performance. In larger distributed computing systems, it has been found that offloading routing decisions to the clients themselves, or otherwise to components that serve as proxies for the clients, can overcome many of the obstacles associated with a centralized routing approach. In many conventional designs, clients that make their own routing decisions are referred to as "smart clients."

In order for clients to make the correct decision on where to route client requests, clients must be provided with routing information that can be used to make educated decisions. Typically, even in the client-side routing approach, the routing information is generated and updated on the servers, or otherwise outside of the clients, due to the fact that the overhead associated with monitoring the status of the distributed computing system can be prohibitively large for a client, and in some instances, clients may not have access to some of the system status information required to make educated routing decisions. As routing information is centrally updated, the routing information is then propagated out to the clients to update local routing information stored on each of the clients.

Many conventional designs use a "push" or epoch approach, whereby the propagation of routing information to clients is initiated by a server or other central component whenever the routing information on the server has changed. By doing so, clients are assured of having the most up-to-date routing information available most of the time.

As distributed computing systems become more complex, powerful and dynamic, however, the routing information maintained in such systems becomes significantly more dynamic in nature. Servers may crash or become bogged down, additional servers may be brought online, services may be added or removed, or may be moved to different servers. The workloads of individual servers may change, as may the number of clients vying for the limited system resources. Servers may also experience changes in resource usage (e.g., pending requests, threads, CPU usage, memory usage, I/O usage, data lock usage, etc.) and may change in configuration. As a result, the optimal routing information for a distributing computing system is constantly in a state of flux.

Under conventional protocols, updates to routing information resulting from changes in system configuration and operating conditions are propagated to all clients, and as such, in complex distributed computing systems that are constantly changing, and that serve potentially millions of clients, the overhead associated with propagating current routing information to all of the clients can be overwhelming.

Therefore, a significant need exists in the art for a more efficient and less costly manner of propagating the routing information used for routing client requests in a distributed computing system.

SUMMARY OF THE INVENTION

The invention addresses these and other problems associated with the prior art in providing an apparatus, program product and method that utilize on-demand propagation of routing information to reduce the overhead associated with distributing routing information throughout a distributed computing system. In particular, in many embodiments consistent with the invention, the staleness of the routing information utilized in routing client requests for a particular client is gauged based upon the number and/or frequency of client requests issued for that client that require rerouting, e.g., as indicated in responses returned in response to the client requests. Once the reroutes of client requests meet a desired propagation criterion, updated routing information is then requested for the client. As such, in many instances, the overhead associated with propagating routing information for the clients in a distributed computing system is greatly reduced as compared to push-type approaches, and the propagation is more focused upon distributing the routing information for those clients most needing the most up-to-date routing information.

Consistent with one aspect of the invention, for example, client requests are routed in a distributed computing system by tracking reroutes of client requests from a client that are routed according to routing information associated with the client, and selectively initiating propagation of updated routing information for the client based upon the tracked reroutes of client requests.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
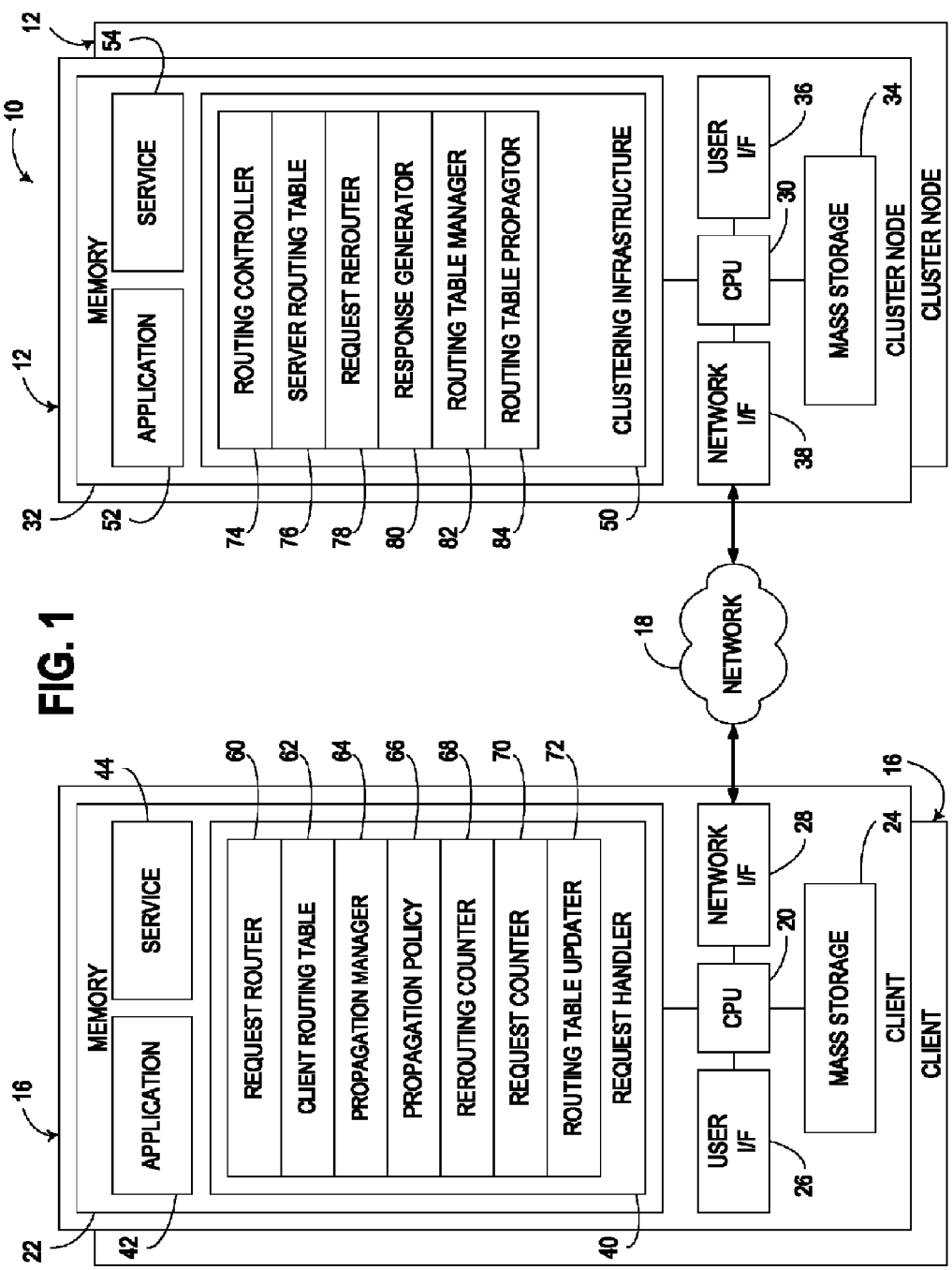
FIG. 1 is a block diagram of a clustered computing system incorporating on-demand routing information propagation consistent with the invention.

The embodiments described hereinafter provide on-demand propagation of routing information used for routing client requests in a distributed computing system. In contrast with a number of traditional routing information propagation techniques, on-demand propagation has significantly reduced overhead, thus improving overall system performance, and in many instances reducing system response times. Propagation of routing information in the illustrated embodiments is on-demand to the extent that the propagation of routing information is initiated by or on behalf of a client when it is determined that the routing information used in routing requests on behalf of a client needs to be updated.

Routing information consistent with the invention may be considered to include practically any information that reflects a perceived optimal routing of client requests to particular servers among a plurality of available servers. In many embodiments, routing information will be embodied in a routing table, although other routing information, e.g., endpoints, endpoint availability, services provided by each endpoint, and roles of services in each endpoint (with additional information such as server weight, CPU usage, memory usage, operational history, etc.), may be used in other embodiments. The routing information distributed or propagated to clients may be consistent among all clients, and may be the same information as that maintained in each server. In the alternative, the routing information maintained on a client may reflect only a subset of the information maintained in a server, and may additionally be limited to that routing information that is relevant to that particular client. Routing information is associated with a particular client when that routing information is used in making routing decisions by or on behalf of a client.

As noted above, routing information is propagated on behalf of a client on-demand, i.e., in response to a determination having been made that the routing information needs to be updated. The determination is typically made based upon tracking the rerouting of requests, e.g., requests that are determined to have been misrouted by a server, and for which responses are returned by the incorrect servers indicating as such to the requesting client (or proxy therefor). For example, the number and/or frequency of rerouted requests may be tracked to determine the need to update the routing information for a client.

In the illustrated embodiments, for example, rerouted requests are tracked via a counter that is incremented for each request that receives a response indicating the request should be rerouted. A second counter is used to track the overall number of requests, and the values stored in these counters are compared to derive a rerouting ratio. If the rerouting ratio exceeds a predetermined threshold (e.g., 2%), the client's routing information is deemed to be out-of-date, and updated routing information is "pulled" by or on behalf of the client. It will be appreciated, however, that other rerouting statistics may be tracked in the alternative, and that other metrics may be calculated from such tracking information to determine whether routing information needs to be updated for a client. Alternate thresholds or policies may also be used as a propagation criterion that determines determine when an update is required.

In addition, the manner in which propagation of updated routing information may be initiated for a client may vary in different embodiments, e.g., via any number of types of requests to a server or service that maintains the routing information. Other variations will be apparent to one of ordinary skill in the art having the benefit of the instant disclosure.

Turning to the Drawings, wherein like numbers denote like parts throughout the several views, FIG. 1 illustrates an exemplary distributed computing system 10, here implemented as a clustered computer system, suitable for implementing on-demand routing information propagation consistent with the invention. FIG. 1, in particular, illustrates a plurality of nodes 12 in clustered computer system 10 that are coupled to a plurality of clients 16 over a network 18. A node 12 typically resides on a single physical computer, e.g., a server-type computer, although it will be appreciated that a multiple nodes may reside on the same physical computer in some embodiments, e.g., in a logically-partitioned computer. The terms "node" and "server" are used interchangeably herein, and as such, it will be appreciated that a given computer in a clustered computer system can be considered to host one or more nodes or servers in a particular clustering environment.

Each node 12 is typically implemented, for example, as any of a number of multi-user computers such as a network server, a midrange computer, a mainframe computer, etc. Each client 16 likewise is typically implemented as any of a number of single-user computers such as workstations, desktop computers, portable computers, and the like. It will be appreciated, however, that any of the nodes 12 or clients 16 may alternatively be implemented using various multi-user or single-user computers, as well as in various other programmable electronic devices such as handheld computers, set top boxes, mobile phones, etc. Particularly when utilized in a service oriented architecture or utility computing architecture, practically any networkable device that is capable of accessing and/or providing a computing service may be utilized in a clustered computing environment consistent with the invention.

Each client 16 generally includes a central processing unit (CPU) 20 including one or more system processors and coupled to a memory or main storage 22, typically through one or more levels of cache memory (not shown). Furthermore, CPU 20 may be coupled to additional peripheral components, e.g., mass storage 24 (e.g., a DASD or one or more disk drives), various input/output devices (e.g., a control panel, display, keyboard, mouse, speaker, microphone, and/or dedicated workstation, etc.) via a user interface 26, and one or more networks 18 via a network interface 28. Likewise, each node 12 typically includes a CPU 30, memory 32, mass storage 34, user interface 36 and network interface 38 that are similarly configured to each client, albeit typically with components more suited for server-type or multi-user workloads. Any number of alternate computer architectures may be used for either clients or nodes in the alternative.

Each client 16 and node 12 is further configured to host various clustering-related software components that are utilized to provide cluster-related services to each client. For example, client 16 incorporates a request handler component 40 that is used to handle cluster-related requests initiated by one or more client applications or services 42, 44 within the client. Each node 12, in turn, includes a clustering infrastructure component 50 that communicates with the request handler 40 in each client to provide the clients with access to various cluster-hosted applications and/or services 52, 54. The request handler 40 and clustering infrastructure 50 may be implemented in various manners within a client or node, including, for example, within a kernel or operating system, within a middleware component, within a device driver, or in other manners that will be apparent to one of ordinary skill having the benefit of the instant disclosure.

The discussion hereinafter will focus on the specific routines utilized to implement the above-described policy management functionality. The routines executed to implement the embodiments of the invention, whether implemented as part of an operating system or a specific application, component, program, object, module or sequence of instructions, will also be referred to herein as "computer program code," or simply "program code." The computer program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

The invention may also include the deployment of suitable program code to implement on-demand routing information propagation in a distributed computing environment. Such deployment may include the deployment of program code to one or more servers and/or one or more clients, and may include automatic or automated installation of such program code. For example, deployment may include on-demand installation of program code in a client in response to that client attempting to connect to a distributed computer system. The deployment may include the transmission of program code over a transmission medium and/or may incorporate the loading and installation of program code via an external storage device.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

In particular, on-demand routing information propagation may be utilized in practically any computing environment in which routing information that is utilized to route client requests is distributed among different components in a distributed computing system, and in particular, in any computing environment in which the generation, optimization and management of routing information is separated from the utilization of the routing information in routing client requests, e.g., within different physical machines or even within different processes resident in the same physical machine.

Figure 2:
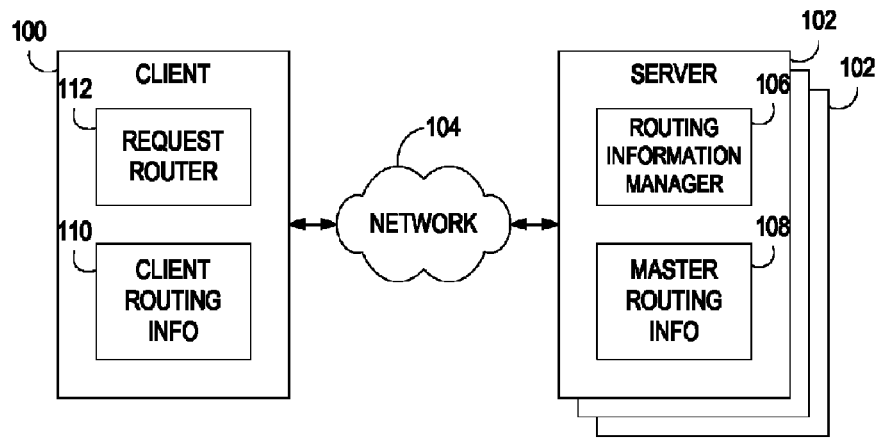
FIG. 2 is a block diagram of a client-server computing system incorporating on-demand routing information propagation consistent with the invention.
Figure 3:
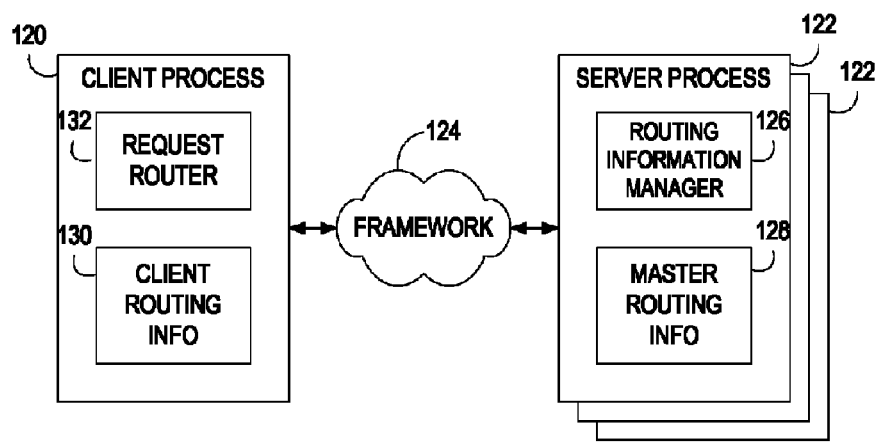
FIG. 3 is a block diagram of a distributed computing system incorporating on-demand routing information propagation between client and server processes in a manner consistent with the invention.
Figure 4:
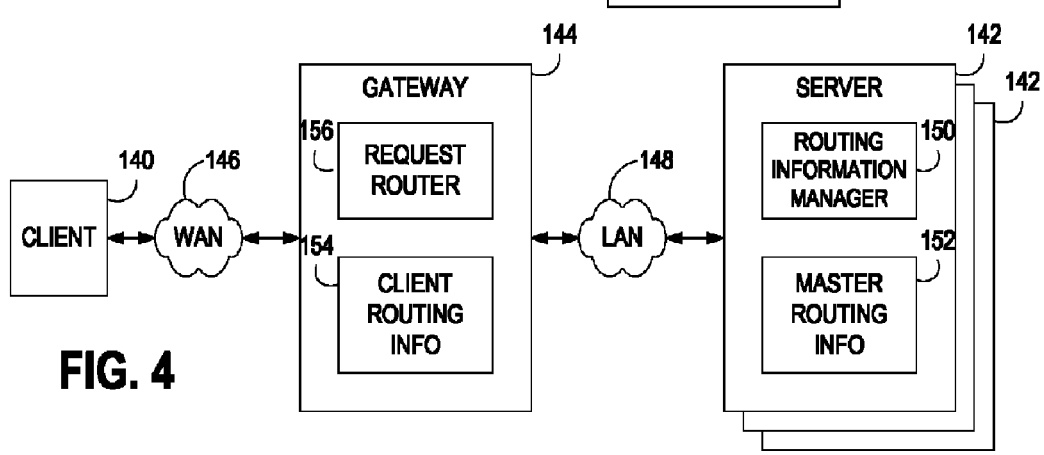
FIG. 4 is a block diagram of a gateway-based distributed computing system incorporating on-demand routing information propagation consistent with the invention.

FIGS. 2-4, for example, respectively illustrate a number of alternative implementations that may utilize on-demand routing information propagation consistent with the invention.

As shown in FIG. 2, for example, on-demand routing information propagation may be used in multi-computer distributed computing environments other than clustered computer systems. In this implementation, a client computer 100 is coupled to a set of servers 102 over a network 104, where at least a subset of the servers are capable of providing one or more services for the client. A routing information manager 106, resident in one or more of servers 102, manages master routing information 108. Among the functions of manager 106 include the creation and updating of routing information, as well as the propagation of routing information to client 100, e.g., as shown in block 110, for use by a request router 112 in routing requests initiated in client 100 to the appropriate servers 102.

The routing information maintained in server 102 is often highly dynamic in nature, e.g., based upon changing server loads, the overall health of various servers, the addition or removal of servers, services and/or clients to or from the distributed computing system, etc. The routing information 110 forwarded to each client 100 (which may constitute all or just a portion of master routing information 108), however, is typically updated only when forwarded by a server. More frequent propagation of routing information to client typically improves the accuracy of request router 112, and results in better routing performance of the overall system. The cost of frequent propagation is an additional communication and processing overhead associated with communicating and updating the routing information within each client. Less frequent propagation of routing information, however, typically increases the number of incorrect routing decisions made by request router 112, but with lower propagation overhead.

It will appreciated that terms "client" and "server" as used herein are merely relative, as components that operate as clients in some contexts may operate as servers in other contexts. For this reason, a client may be considered to incorporate any component capable of serving as a "requester" or "caller" for a particular service, with a server considered to incorporate any component capable of providing that particular service, e.g., as a "responder" or "callee." As but one example, in an n-tier distributed architecture, front tier servers often act as clients of back tier servers in the same manner that user computers act as clients to web servers, and that web servers act as clients to database servers.

Furthermore, as best illustrated in FIG. 3, clients and servers may constitute different processes or components, which may or may not be resident within the same physical machine. FIG. 3 illustrates a client process 120 coupled to a plurality of server processes 122 via a framework 124, with a routing information manager 126 resident in one or more of the server processes to create and update master routing information 128, as well as to propagate routing information (e.g., routing information 130) to client process 120 for use by a request router component 132. In a J2EE environment, for example, client proxies may act as clients to servlet containers, servlet containers may act as clients to EJB containers, EJB containers may act as clients to a back-end database server, etc.

In addition, it will be appreciated that the functions provided by a request router and/or a routing table manager, as well as the locations of the respective client and master routing information, may vary in different embodiments, i.e., the request router and client routing information need not be resident within a client, and the routing information manager and master routing information need not be resident within a server. As shown in FIG. 4, for example, in a gateway-based architecture, a client 140 may interface with a plurality of servers 142 through an intermediate gateway 144 coupled respectively to client 140 and servers 142 through networks 146, 148 (e.g., WAN and LAN networks), such that all client requests are initially sent to the gateway server, which handles the routing of requests on behalf of multiple clients. In this instance, routing information manager 150 and master routing information 152 may be maintained on one or more of servers 142 (or alternatively, via a separate component from any of servers 142), but the client routing information 154 and/or the request router 154 may be maintained in the gateway 144 (which may itself be a stand-alone component or may be a distributed service). In this regard, it will also be appreciated that a gateway or other proxy may track the rerouting of requests for multiple clients and initiate propagation of routing information on behalf of multiple clients in appropriate circumstances.

In most implementations, the request router, which uses the routing information in routing client requests to an appropriate server, is in a separate process from the that of the routing information manager that maintains and updates the routing information, such that the request router is effectively unaware of any dynamic changes occurring on the server side of the distributed computing environment, e.g., due to server load, server availability, service availability, cache status, cluster status, performance, etc.

Returning now to FIG. 1, in clustered computer system 10, on-demand routing information propagation is implemented using a request handler 40 that resides within each client 16 along with a clustering infrastructure 50 that resides in each node, or server, 12. The functions associated with implementing on-demand routing information propagation in request handler 40 are illustrated in FIG. 1 as components 60-72, while the associated functions implemented by clustering infrastructure 50 are illustrated as components 74-84.

Request handler 40 includes a request router component 60 that receives each client request and makes the determination as to which cluster node or server the request should be routed. The request handler 40 relies on routing information, in this implementation a client routing table 62, which includes a list of servers to which different requests from this client should be routed. It will be appreciated that a client routing table may take any number of forms, and that routing information may take any number of alternate forms to that of a routing table. The routing information may be specific to the client or may be identical to that used by other clients, and may constitute all or only a portion of the routing information maintained on each cluster node 12.

A propagation manager 64 is also utilized in request handler 40, and is used not only to track the efficacy or "freshness" of the client routing table by tracking reroutes of client requests, but also to initiate the propagation of an updated client routing table to the client when the current client routing table is determined to be sub-optimal or stale. The determination of when the client routing table needs to be updated may be based upon a propagation policy 66 maintained by propagation manager 64. In the illustrated embodiment, the propagation policy may be based upon a rerouting ratio calculated from a rerouting counter 68 and a request counter 70 that are respectively updated by the propagation manager as client requests are processed by request handler 40, e.g., to initiate a propagation if the ratio of rerouted requests to overall requests exceeds a threshold such as 2%. A routing table updater component 72, incorporated into propagation manager 64, is used to initiate the updating of client routing table 62 when so deemed necessary by propagation policy 66.

For cluster infrastructure 50 on each node 12, a routing controller 74 processes incoming client requests directed to the cluster node, which in part includes verifying whether a client's routing decision was appropriate. The routing controller typically relies on a server routing table 76, which corresponds to client routing table 62, but which is updated more frequently based upon the current operating conditions of the clustered computer system, and is thus more accurate and up-to-date than the routing information resident on the client.

In the event that the routing controller determines that the request was misrouted based upon the server routing table, a request rerouter component 78 determines the cluster node to which the request should have been routed, and a response generator component 80 generates and returns a response to the client indicating that the request needs to be rerouted, typically also identifying the cluster node to which the request should have been routed. In the event that the routing decision by the client was correct, the response generator 80 will return the appropriate response after the requested cluster service has been accessed.

A routing table manager component 82 manages server routing table 76, updating the table based upon the current cluster configuration and other environmental and workload conditions. A routing table propagator component 84 distributes routing information from server routing table 76 to each client in response to a request from routing table updater 72.

Of note, the routing information maintained in cluster nodes 12 and managed by routing table manager 82 is typically distributed on each cluster node 12 such that each node maintains a current copy of the optimal routing information. In other embodiments, the management of routing information may be centralized, e.g., in a component other than a node 12. It will also be appreciated that any known technique for generating and updating routing information to optimize the performance of a distributed computing system may be used consistent with the invention.

It will be appreciated that the functionality incorporated into components 60-84 may be implemented in different components consistent with the invention. The invention is therefore not limited to the particular implementation disclosed in FIG. 1.

Figure 5:
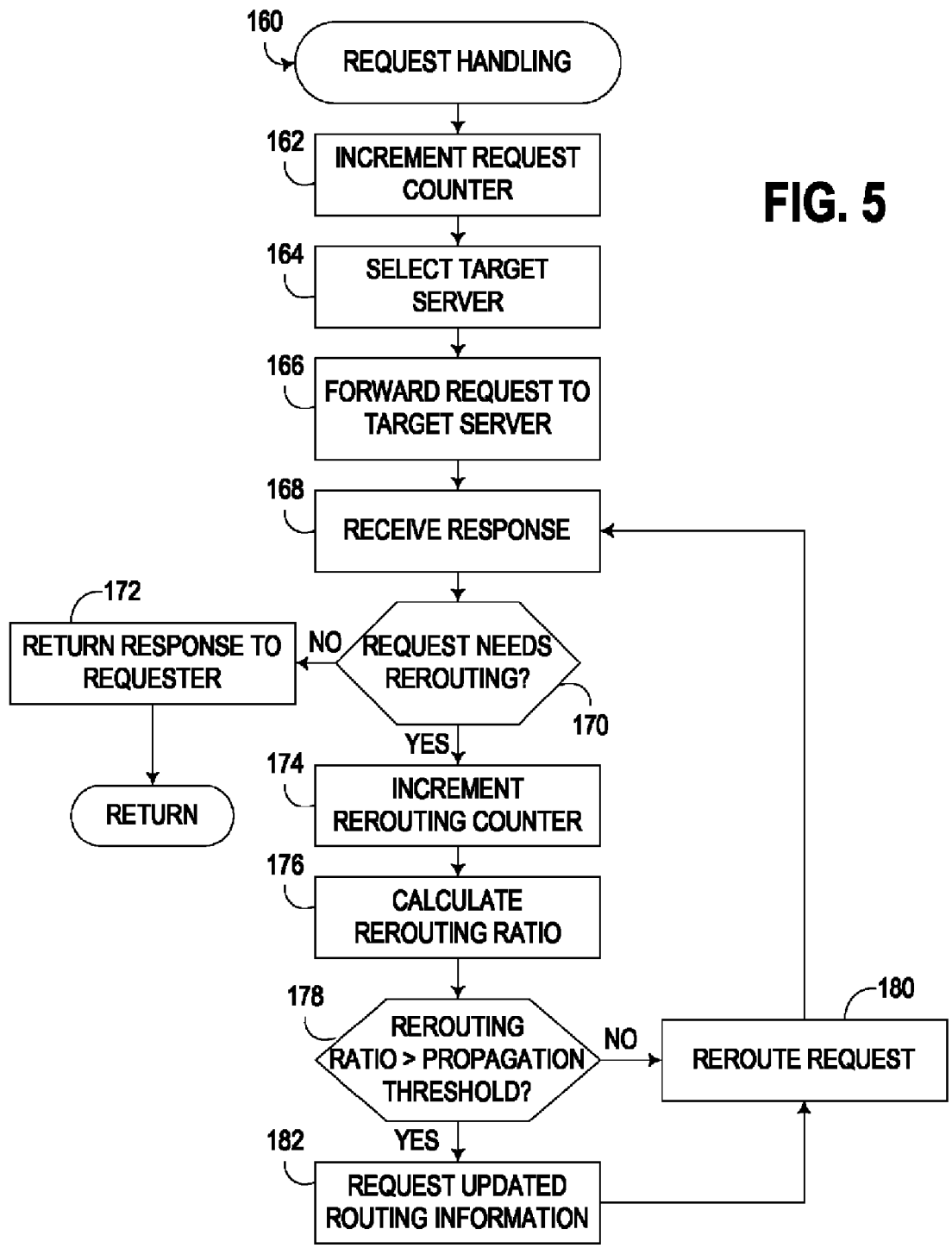
FIG. 5 is a flowchart illustrating the program flow of an exemplary request handling routine capable of being executed by a client in the clustered computing system of FIG. 1.

The operation of request handler 40 in handling client requests is further illustrated by request handling routine 160 of FIG. 5. Routine 160 is initiated in response to a client request, and begins in block 162 by incrementing the request counter to log the reception of a request. Next, in block 164 a target server is selected to handle the request, based upon the routing information in the client routing table. Next, in block 166 the request is forwarded to the selected target server, and routine 160 waits for a response from the selected server, which is received in block 168.

In response to the request, the target server may elect to handle the request, or alternatively, may determine that, based upon more current routing information available in the node or server, that the target server either cannot, or should not, handle the request. In the former case, the response will typically include any requested data along with an indication that the request is complete. Alternatively, if an error is detected when processing the request, the server may also return such an indication in the response. However, in the event that the target server determines that another server should handle the request, the target server will indicate that the request needs to be rerouted, including additionally an indication of the identity of the correct server. As such, block 170 of routine 160 determines from the response whether the request needs to be rerouted.

If not, control is passed to block 172 to return the response to the requester in the client, and routine 160 is complete. Otherwise, block 170 passes control to block 174 to increment the rerouting counter to log the occurrence of a rerouted request. Next, in block 176 a rerouting ratio is calculated by dividing the value stored in the rerouting counter by the value stored in the request counter. Block 178 then determines whether the rerouting ratio is greater than a propagation threshold, e.g., 2%. The propagation threshold may be stored, for example, in the propagation policy, and may be configurable in some instances.

If the rerouting ratio is not greater than the threshold, control passes to block 180 to reroute the request to the server identified in the response. Control then passes to block 168 to receive the response from the new server. On the other hand, if the rerouting ratio is greater than the threshold, block 178 instead passes control to block 182 to request updated routing information from one of nodes 12, to effectively initiate the propagation of updated routing information to the client. Control then passes to block 180 to reroute the request in the manner described above. Once a suitable response has been received from the appropriate server, block 170 passes control to block 172 to return the response to the appropriate requester on the client, and routine 160 is complete.

In an alternate embodiment, the correct server may not be identified in the rerouting response. In such an instance, the request handler may initiate the propagation of the updated routing information and use the updated routing information to thereafter reroute the request. Other modifications will be apparent to one of ordinary skill in the art having the benefit of the instant disclosure.

It will therefore be appreciated that the illustrated embodiments are often capable of significantly reducing the overhead of propagating routing information to clients or other client request handlers in a distributed computing system. In contrast to epoch-based systems, in which routing information is synchronized between servers and clients in response to practically every change in system operating conditions, routing information is only propagated to those client request handlers for which the local routing information therefor has become sufficiently out-of-date.

Various modifications may be made to the illustrated embodiments without departing from the spirit and scope of the invention. For example, a request that is deemed a rerouted request may not need to be resent by a client in some embodiments consistent with the invention. For example, in some embodiments, a target server that determines that a request should have been routed to a different server may forward the request to the correct server, and may optionally send a separate response to the requesting client indicating that the request was forwarded. In the alternative, the server to which a request was forwarded by an original target server may indicate that the request was rerouted in its response. In still other embodiments, a target server that should not have received a request may nonetheless still be able to service the request, and may indicate in the response that the request should have been routed to another server. In the latter instance, the request, while still handled by the server, may still be considered to be a rerouted request for the purposes of on-demand routing information propagation.

Other modifications will be apparent to one of ordinary skill in the art. Therefore, the invention lies in the claims hereinafter appended.

What is claimed is:

1. A method of routing client requests in a distributed computing system, the method comprising:
   in response to receiving a request in the client:
      selecting one of a plurality of servers to handle the request based upon a routing table resident in the client; and
      sending the request to the selected server; and
   in response to receiving a response to the request from the selected server;
      determining whether the response indicates that the request needs to be rerouted;
      updating a rerouting statistic if the response indicates that the request needs to be rerouted; and retrieving an updated copy of the routing table for the client if the rerouting statistic meets a propagation criterion.

2. A method of propagating routing information in a distributed computing system, the method comprising:
tracking reroutes of client requests from a client that are routed according to routing information associated with the client; and
selectively initiating propagation of updated routing information for the client based upon the tracked reroutes of client requests.

3. The method of claim 2, wherein the routing information associated with the client is resident in the client, and wherein tracking reroutes of client requests and selectively initiating propagation of the routing information are performed by the client.

4. The method of claim 3, further comprising, in the client, routing the client requests according to the routing information resident in the client.

5. The method of claim 4, wherein routing the client requests includes, for a first request, selecting one of a plurality of servers to handle the first request based upon the routing information and forwarding the first request to the selected server.

6. The method of claim 5, wherein the plurality of servers comprise a cluster, and wherein the client is a client of the cluster.

7. The method of claim 5, wherein the client and the plurality of servers each comprise a process.

8. The method of claim 2, wherein the routing information associated with the client is resident in a gateway, and wherein at least one of tracking reroutes of client requests and selectively initiating propagation of the routing information are performed by the gateway.

9. The method of claim 2, wherein the routing information includes a routing table.

10. The method of claim 2, wherein tracking reroutes of client requests includes incrementing a rerouting counter in response to receiving a response to a client request that indicates that the request needs to be rerouted.

11. The method of claim 10, further comprising incrementing a request counter in response to receiving a response to a client request, wherein selectively initiating propagation of the routing information for the client based upon the tracked reroutes of client requests includes initiating propagation of the routing information for the client in response to a ratio between the rerouting and request counters exceeding a threshold.

12. The method of claim 2, wherein selectively initiating propagation of the routing information for the client based upon the tracked reroutes of client requests includes initiating propagation of the routing information for the client in response to a rerouting ratio meeting a propagation criterion.

13. The method of claim 12, wherein the propagation criterion is a rerouting ratio for the client exceeding a threshold.

14. The method of claim 2, wherein selectively initiating propagation of the routing information for the client based upon the tracked reroutes of client requests is performed in response to receiving a response to a client request that indicates that the request needs to be rerouted.

15. The method of claim 2, wherein initiating propagation of the routing information for the client includes requesting download of an updated copy of a routing table for the client.

16. The method of claim 2, further comprising updating the routing information associated with the client in a first process separate from a second process that routes client requests according to the routing information, wherein initiating propagation of updated routing information for the client includes retrieving updated routing information generated in the first process into the second process.

17. The method of claim 16, wherein updating the routing information in the first process includes updating the routing information based upon at least one of server load, server availability, service availability, cache status, cluster status, and performance.

18. An apparatus, comprising:
at least one processor; and
program code configured to be executed by the processor to propagate routing information in a distributed computing system by tracking reroutes of client requests from a client that are routed according to routing information associated with the client and selectively initiating propagation of updated routing information for the client based upon the tracked reroutes of client requests.

19. The apparatus of claim 18, wherein the at least one processor, the program code and the routing information are resident in the client, and wherein the program code is further configured to route the client requests according to the routing information resident in the client.

20. The apparatus of claim 18, wherein the program code is configured to, for a first request, select one of a plurality of servers to handle the first request based upon the routing information and forward the first request to the selected server.

21. The apparatus of claim 18, wherein the program code is configured to selectively initiate propagation of the routing information for the client based upon the tracked reroutes of client requests by initiating propagation of the routing information for the client in response to a rerouting ratio meeting a propagation criteria.

22. The apparatus of claim 18, wherein the program code is configured to selectively initiate propagation of the routing information for the client based upon the tracked reroutes of client requests in response to receiving a response to a client request that indicates that the request needs to be rerouted.

23. The apparatus of claim 18, wherein the program code is configured to initiate propagation of the routing information to the client by requesting download of an updated copy of a routing table for the client.

24. The apparatus of claim 18, wherein the routing information associated with the client is updated in a first process that is separate from a second process that routes client requests according to the routing information, and wherein the program code is configured to initiate propagation of updated routing information for the client by retrieving updated routing information generated in the first process into the second process.

25. A program product, comprising:
program code configured to propagate routing information in a distributed computing system by tracking reroutes of client requests from a client that are routed according to routing information associated with the client and selectively initiating propagation of updated routing information for the client based upon the tracked reroutes of client requests; and
a non-transitory computer readable medium bearing the program code.

* * * * *